United States Patent
Lin et al.

(10) Patent No.: US 12,548,141 B2
(45) Date of Patent: Feb. 10, 2026

(54) ACTIVE LEARNING-BASED DEFECT LOCATION IDENTIFICATION

(71) Applicant: ASML NETHERLANDS B.V., Veldhoven (NL)

(72) Inventors: Chenxi Lin, Newark, CA (US); Yi Zou, Foster City, CA (US); Tanbir Hasan, San Jose, CA (US); Huina Xu, Los Altos, CA (US); Ren-Jay Kou, Cupertino, CA (US); Nabeel Noor Moin, Fort Collins, CO (US); Kourosh Nafisi, San Jose, CA (US)

(73) Assignee: ASML NETHERLANDS B.V., Veldhoven (NL)

( * ) Notice: Subject to any disclaimer, the term of this patent is extended or adjusted under 35 U.S.C. 154(b) by 454 days.

(21) Appl. No.: 18/033,786

(22) PCT Filed: Nov. 2, 2021

(86) PCT No.: PCT/EP2021/080304
§ 371 (c)(1),
(2) Date: Apr. 25, 2023

(87) PCT Pub. No.: WO2022/101051
PCT Pub. Date: May 19, 2022

(65) Prior Publication Data
US 2023/0401694 A1 Dec. 14, 2023

Related U.S. Application Data

(60) Provisional application No. 63/113,347, filed on Nov. 13, 2020.

(51) Int. Cl.
*G06T 7/00* (2017.01)

(52) U.S. Cl.
CPC .... *G06T 7/001* (2013.01); *G06T 2207/20081* (2013.01); *G06T 2207/30148* (2013.01)

(58) Field of Classification Search
CPC ........... G06T 7/001; G06T 2207/20081; G06T 2207/30148; G03F 7/706833; G03F 7/706841; G03F 7/7065; G03F 7/705
See application file for complete search history.

(56) References Cited

U.S. PATENT DOCUMENTS

| | | | |
|---|---|---|---|
| 5,960,185 A | 9/1999 | Nguyen | |
| 11,275,361 B2 * | 3/2022 | Yati | G05B 19/41875 |

(Continued)

FOREIGN PATENT DOCUMENTS

| | | |
|---|---|---|
| CN | 111353521 | 6/2020 |
| EP | 3352032 | 7/2018 |

(Continued)

OTHER PUBLICATIONS

International Search Report and Written Opinion issued in corresponding International Application No. PCT/EP2021/080304, dated Feb. 9, 2022.

(Continued)

*Primary Examiner* — Stephen R Koziol
(74) *Attorney, Agent, or Firm* — Pillsbury Winthrop Shaw Pittman, LLP

(57) ABSTRACT

A method and apparatus for identifying locations to be inspected on a substrate is disclosed. A defect location prediction model is trained using a training dataset associated with other substrates to generate a prediction of defect or non-defect and a confidence score associated with the prediction for each of the locations based on process-related data associated with the substrates. Those of the locations determined by the defect location prediction model as having confidences scores satisfying a confidence threshold are (Continued)

added to a set of locations to be inspected by an inspection system. After the set of locations are inspected, the inspection results data is obtained, and the defect location prediction model is incrementally trained by using the inspection results data and process-related data for the set of locations as training data.

20 Claims, 9 Drawing Sheets

(56) References Cited

U.S. PATENT DOCUMENTS

| | | | |
|---|---|---|---|
| 11,568,324 B2* | 1/2023 | Lee | G06N 20/20 |
| 2017/0047195 A1* | 2/2017 | Lee | H01L 22/12 |
| 2018/0197714 A1 | 7/2018 | Philal et al. | |
| 2019/0004504 A1 | 1/2019 | Yati | |
| 2019/0187670 A1 | 6/2019 | Fang | |
| 2019/0369503 A1 | 12/2019 | Ypma et al. | |
| 2019/0370955 A1 | 12/2019 | Zhang et al. | |
| 2020/0202257 A1* | 6/2020 | Lee | G06V 10/82 |

FOREIGN PATENT DOCUMENTS

| | | | |
|---|---|---|---|
| JP | 2015201055 A | * | 11/2015 |
| TW | 201704849 | | 2/2017 |
| TW | 202038145 | | 10/2020 |

OTHER PUBLICATIONS

Office Action issued in corresponding Taiwanese Patent Application No. 110140696, dated Oct. 24, 2022.

H. Yang et al., "Bridging the Gap Between Layout Pattern Sampling and Hotspot Detection via Batch Active Learning", https://arxiv.org/abs/1807.06446 (accessed on Apr. 24, 2023) (Jul. 13, 2018).

G. Susto, "A Dynamic Sampling Strategy based on Confidence Level of Virtual Metrology Predictions", Proceedings of 28th Annual Semi Adv. Semiconductor Manuf. Conf. (ASMC), pp. 78-83 (2017).

S. Argamon-Engelson et al., "Committee-Based Sample Selection for Probabilistic Classifiers", Journal of Artificial Intelligence Research, 11, pp. 335-360 (1999).

A. McCallum et al., "Employing EM and Pool-Based Active Learning for Text Classification," Proc. of 15th Intl. Conf. on Machine Learning, pp. 1-9 (1998).

N. Abe et al., "Query Learning Strategies using Boosting and Bagging," Proceedings of 15th Intl. Conf. on Machine Learning, pp. 1-9 (1998).

J. Prendki et al., "An introduction to active learning", Figure Eight, pp. 1-27, (2018).

Office Action issued in corresponding Japanese Patent Application No. 2023-527060, dated Aug. 26, 2025.

Office Action issued in corresponding Israeli Patent Application No. 302789, dated Oct. 26, 2025.

* cited by examiner

ACTIVE LEARNING-BASED DEFECT LOCATION IDENTIFICATION

CROSS-REFERENCE TO RELATED APPLICATIONS

This application is a U.S. national phase entry of PCT Patent Application No. PCT/EP2021/080304 which was filed on Nov. 2, 2021, which claims priority of U.S. Provisional Application No. 63/113,347 which was filed on Nov. 13, 2020 and which is incorporated herein in its entirety by reference.

TECHNICAL FIELD

The embodiments provided herein relate to semiconductor manufacturing, and more particularly to inspecting a semiconductor substrate.

BACKGROUND

In manufacturing processes of integrated circuits (ICs), unfinished or finished circuit components are inspected to ensure that they are manufactured according to design and are free of defects. Inspection systems utilizing optical microscopes or charged particle (e.g., electron) beam microscopes, such as a scanning electron microscope (SEM) can be employed. As the physical sizes of IC components continue to shrink, accuracy and yield in defect detection become more important.

However, imaging resolution and throughput of inspection tools struggles to keep pace with the ever-decreasing feature size of IC components. The accuracy, resolution, and throughput of such inspection tools may be limited by lack of accuracy in detecting a wafer displacement.

SUMMARY

The embodiments provided herein disclose a particle beam inspection apparatus, and more particularly, an inspection apparatus using a plurality of charged particle beams.

In some embodiments, there is provided a non-transitory computer-readable medium having instructions that, when executed by a computer, cause the computer to execute a method for identifying locations to inspect on a substrate. The method includes: selecting a plurality of locations on the substrate to inspect based on a first sub-model of a defect location prediction model that is trained using an initial training dataset associated with other substrates to generate a prediction of defect or non-defect for each of the locations; using a second sub-model of the defect location prediction model that is trained using the initial training dataset, generating a confidence score for each of the locations based on process-related data associated with the substrate, wherein the confidence score is indicative of a confidence in the prediction for the corresponding location; adding each of the locations for which the confidence score satisfies one of a plurality of confidence thresholds to a set of locations to be inspected by an inspection system; obtaining inspection results data; and incrementally training the defect location prediction model by providing the inspection results data and process-related data for the set of locations as training data to the defect location prediction model.

In some embodiments, there is provided a non-transitory computer-readable medium having instructions that, when executed by a computer, cause the computer to execute a method for identifying locations to inspect on a first substrate using a machine learning model and for training the machine learning model to identify locations to inspect on a second substrate based on inspection results of the locations on the first substrate. The method includes: inputting process-related data associated with the substrate to a defect location prediction model; generating, using the defect location prediction model, a prediction of defect or non-defect for each of a plurality of locations on the substrate, wherein each prediction is associated with a confidence score that is indicative of a confidence in the prediction for the corresponding location; adding each of the locations for which the confidence score satisfies one of a plurality of confidence thresholds to a set of locations to be inspected by an inspection system; obtaining inspection results data for the set of locations from the inspection system; and inputting the inspection results data and process-related data for the set of locations to the defect location prediction model for training the defect location prediction model.

In some embodiments, there is provided a method for identifying locations to inspect on a first substrate using a machine learning model and for training the machine learning model to identify locations to inspect on a second substrate based on inspection results of the locations on the first substrate. The method includes: inputting process-related data associated with the substrate to a defect location prediction model; generating, using the defect location prediction model, a prediction of defect or non-defect for each of a plurality of locations on the substrate, wherein each prediction is associated with a confidence score that is indicative of a confidence in the prediction for the corresponding location; adding each of the locations for which the confidence score satisfies a confidence threshold to a set of locations to be inspected by an inspection system; obtaining inspection results data for the set of locations from the inspection system; and inputting the inspection results data and process-related data for the set of locations to the defect location prediction model for training the defect location prediction model.

In some embodiments, there is provided an apparatus for identifying locations to inspect on a first substrate using a machine learning model and for training the machine learning model to identify locations to inspect on a second substrate based on inspection results of the locations on the first substrate. The apparatus includes: a memory storing a set of instructions; and at least one processor configured to execute the set of instructions to cause the apparatus to perform a method, which includes: inputting process-related data associated with the substrate to a defect location prediction model; generating, using the defect location prediction model, a prediction of defect or non-defect for each of a plurality of locations on the substrate, wherein each prediction is associated with a confidence score that is indicative of a confidence in the prediction for the corresponding location; adding each of the locations for which the confidence score satisfies a confidence threshold to a set of locations to be inspected by an inspection system; obtaining inspection results data for the set of locations from the inspection system; and inputting the inspection results data and process-related data for the set of locations to the defect location prediction model for training the defect location prediction model.

In some embodiments, a non-transitory computer readable medium that stores a set of instructions that is executable by at least one processor of a computing device to cause the computing device to perform a method discussed above.

Other advantages of the embodiments of the present disclosure will become apparent from the following description taken in conjunction with the accompanying drawings wherein are set forth, by way of illustration and example, certain embodiments of the present invention.

DETAILED DESCRIPTION

Figure 1:
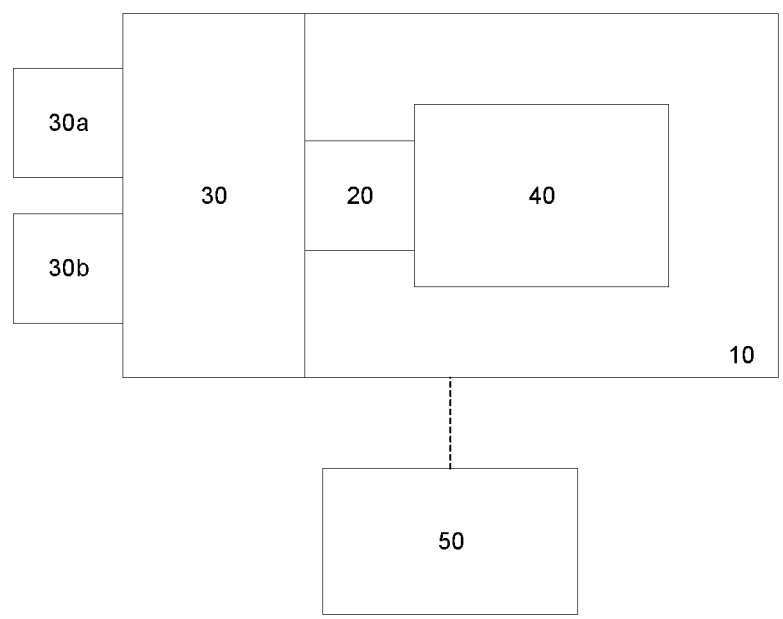
FIG. 1 is a schematic diagram illustrating an example electron beam inspection (EBI) system, consistent with embodiments of the present disclosure.

Electronic devices are constructed of circuits formed on a piece of silicon called a substrate. Many circuits may be formed together on the same piece of silicon and are called integrated circuits or ICs. The size of these circuits has decreased dramatically so that many more of them can fit on the substrate. For example, an IC chip in a smart phone can be as small as a thumbnail and yet may include over 2 billion transistors, the size of each transistor being less than 1/1000th the size of a human hair. Making these extremely small ICs is a complex, time-consuming, and expensive process, often involving hundreds of individual steps. Errors in even one step have the potential to result in defects in the finished IC rendering it useless. Thus, one goal of the manufacturing process is to avoid such defects to maximize the number of functional ICs made in the process, that is, to improve the overall yield of the process.

One component of improving yield is monitoring the chip making process to ensure that it is producing a sufficient number of functional integrated circuits. One way to monitor the process is to inspect the chip circuit structures at various stages of their formation. Inspection can be carried out using a scanning electron microscope (SEM). An SEM can be used to image these extremely small structures, in effect, taking a "picture" of the structures. The image can be used to determine if the structure was formed properly and also if it was formed in the proper location. If the structure is defective, then the process can be adjusted so the defect is less likely to recur.

Inspecting a substrate is a resource intensive process and inspecting all locations on the substrate may not only consume significant computing resources, but also time. For example, it may a number of days to inspect an entire substrate. One of the ways to make the inspection process more efficient (e.g., minimize the resources consumed) is to identify locations on the substrate that are likely to have a defect and inspect only those identified locations instead of all locations. For example, prior methods used a machine learning (ML) model to predict locations that are likely to have a defect. The prior methods determine whether a location on the substrate is having a defect or not. However, the prior methods have drawbacks. For example, some of these methods are inaccurate, e.g., they either miss defective locations or identify a non-defective location as having a defect. Because of the inaccuracy in predictions, the inspection systems may miss inspecting such defective locations, thus resulting in a defective finished IC. In another example, such prior methods are not self-repairing. That is, if a method predicts a specified location as having a defect for a particular substrate, then it continues to predict such similar locations on any subsequently inspected substrate as having a defect regardless of whether those locations have a defect or not, rendering the inspection process useless or less effective.

Embodiments of the present disclosure discuss an inspection method that assigns a confidence score, which is indicative of a confidence of a defect prediction for each location of a substrate, and selects all those locations having a confidence score satisfying a confidence threshold for inspection. For example, a first prediction model may predict that a specified location has no defect and a second prediction model may determine a confidence score for the specified location indicating that the confidence of the prediction is low (e.g., confidence score below a specified confidence threshold). By selecting those locations with a low confidence score, the embodiments may not miss any (or miss fewer than prior methods) defective locations for inspection. The inspection method of the disclosed embodiments is also self-repairing. After the locations with a low confidence score are inspected by an inspection system (e.g., SEM), the inspection results data (e.g., SEM image of the inspected locations, information such as whether a location is defective or not based on the actual inspection) obtained from the inspection system are fed back to the prediction models to adjust their predictions regarding those locations. By inputting the actual inspection results of those locations with low confidence score to the prediction models, the prediction models are further trained to predict the likelihood of defect at such locations for any subsequently inspected substrate with a greater accuracy. By incrementally training the prediction models with the inspection results from every substrate that is inspected subsequently, the prediction models may start generating predictions for such locations with a greater confidence score, minimize the number of locations to be inspected, thereby improving the yield.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations. Instead, they are merely examples of apparatuses and methods consistent with aspects related to the disclosed embodiments as recited in the appended claims. For example, although some embodiments are described in the context of utilizing electron beams, the disclosure is not so limited. Other types of charged particle beams may be similarly applied. Furthermore, other imaging systems may be used, such as optical imaging, photo detection, x-ray detection, etc.

Although specific reference may be made in this text to the manufacture of ICs, it should be explicitly understood that the description herein has many other possible applications. For example, it may be employed in the manufacture of integrated optical systems, guidance and detection patterns for magnetic domain memories, liquid-crystal display panels, thin-film magnetic heads, etc. The skilled artisan will appreciate that, in the context of such alternative applications, any use of the terms "reticle", "wafer" or "die" in this text should be considered as interchangeable with the more general terms "mask", "substrate" and "target portion", respectively.

In the present document, the terms "radiation" and "beam" are used to encompass all types of electromagnetic radiation, including ultraviolet radiation (e.g. with a wavelength of 365, 248, 193, 157 or 126 nm) and EUV (extreme ultra-violet radiation, e.g. having a wavelength in the range 5-20 nm).

Reference is now made to FIG. 1, which illustrates an example electron beam inspection (EBI) system 100 consistent with embodiments of the present disclosure. As shown in FIG. 1, charged particle beam inspection system 100 includes a main chamber 10, a load-lock chamber 20, an electron beam tool 40, and an equipment front end module (EFEM) 30. Electron beam tool 40 is located within main chamber 10. While the description and drawings are directed to an electron beam, it is appreciated that the embodiments are not used to limit the present disclosure to specific charged particles.

EFEM 30 includes a first loading port 30a and a second loading port 30b. EFEM 30 may include additional loading port(s). First loading port 30a and second loading port 30b receive wafer front opening unified pods (FOUPs) that contain wafers (e.g., semiconductor wafers or wafers made of other material(s)) or samples to be inspected (wafers and samples are collectively referred to as "wafers" hereafter). One or more robot arms (not shown) in EFEM 30 transport the wafers to load-lock chamber 20.

Load-lock chamber 20 is connected to a load/lock vacuum pump system (not shown), which removes gas molecules in load-lock chamber 20 to reach a first pressure below the atmospheric pressure. After reaching the first pressure, one or more robot arms (not shown) transport the wafer from load-lock chamber 20 to main chamber 10. Main chamber 10 is connected to a main chamber vacuum pump system (not shown), which removes gas molecules in main chamber 10 to reach a second pressure below the first pressure. After reaching the second pressure, the wafer is subject to inspection by electron beam tool 40. In some embodiments, electron beam tool 40 may comprise a single-beam inspection tool. In other embodiments, electron beam tool 40 may comprise a multi-beam inspection tool.

Controller 50 may be electronically connected to electron beam tool 40 and may be electronically connected to other components as well. Controller 50 may be a computer configured to execute various controls of charged particle beam inspection system 100. Controller 50 may also include processing circuitry configured to execute various signal and image processing functions. While controller 50 is shown in FIG. 1 as being outside of the structure that includes main chamber 10, load-lock chamber 20, and EFEM 30, it is appreciated that controller 50 can be part of the structure.

While the present disclosure provides examples of main chamber 10 housing an electron beam inspection system, it should be noted that aspects of the disclosure in their broadest sense, are not limited to a chamber housing an electron beam inspection system. Rather, it is appreciated that the foregoing principles may be applied to other chambers as well.

Figure 2:
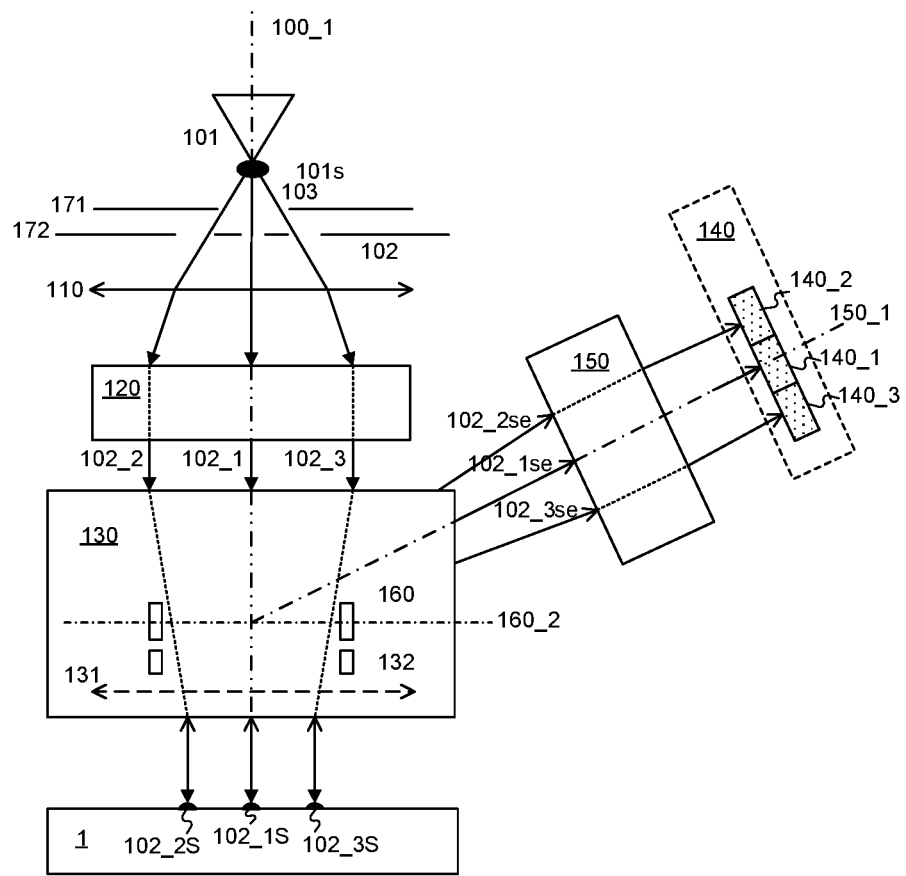
FIG. 2 is a schematic diagram illustrating an example electron beam tool that can be a part of the electron beam inspection system of FIG. 1, consistent with embodiments of the present disclosure.

Reference is now made to FIG. 2, which illustrates a schematic diagram illustrating an example electron beam tool 40 that can be a part of the example charged particle beam inspection system 100 of FIG. 1, consistent with embodiments of the present disclosure. An electron beam tool 40 (also referred to herein as apparatus 40) comprises an electron source 101, a gun aperture plate 171 with a gun aperture 103, a pre-beamlet forming mechanism 172, a condenser lens 110, a source conversion unit 120, a primary projection optical system 130, a sample stage (not shown in FIG. 2), a secondary imaging system 150, and an electron detection device 140. Primary projection optical system 130 can comprise an objective lens 131. Electron detection device 140 can comprise a plurality of detection elements 1401, 1402, and 140_3. Beam separator 160 and deflection scanning unit 132 can be placed inside primary projection optical system 130. It may be appreciated that other commonly known components of apparatus 40 may be added/omitted as appropriate.

Electron source 101, gun aperture plate 171, condenser lens 110, source conversion unit 120, beam separator 160, deflection scanning unit 132, and primary projection optical system 130 can be aligned with a primary optical axis 100_1 of apparatus 100. Secondary imaging system 150 and electron detection device 140 can be aligned with a secondary optical axis 150_1 of apparatus 40.

Electron source 101 can comprise a cathode, an extractor or an anode, wherein primary electrons can be emitted from the cathode and extracted or accelerated to form a primary electron beam 102 that forms a crossover (virtual or real) 101s. Primary electron beam 102 can be visualized as being emitted from crossover 101s.

Source conversion unit 120 may comprise an image-forming element array (not shown in FIG. 2), an aberration compensator array (not shown), a beam-limit aperture array (not shown), and a pre-bending micro-deflector array (not shown). The image-forming element array can comprise a plurality of micro-deflectors or micro-lenses to form a plurality of parallel images (virtual or real) of crossover 101s with a plurality of beamlets of primary electron beam 102. FIG. 2 shows three beamlets 102_1, 102_2, and 102_3 as an example, and it is appreciated that the source conversion unit 120 can handle any number of beamlets.

In some embodiments, source conversion unit 120 may be provided with beam-limit aperture array and image-forming element array (both are not shown). The beam-limit aperture array may comprise beam-limit apertures. It is appreciated that any number of apertures may be used, as appropriate. Beam-limit apertures may be configured to limit sizes of beamlets 102_1, 102_2, and 102_3 of primary electron beam 102. The image-forming element array may comprise image-forming deflectors (not shown) configured to deflect beamlets 102_1, 102_2, and 102_3 by varying angles towards primary optical axis 100_1. In some embodiments, deflectors further away from primary optical axis 100_1 may deflect beamlets to a greater extent. Furthermore, image-forming element array may comprise multiple layers (not illustrated), and deflectors may be provided in separate layers. Deflectors may be configured to be individually controlled independent from one another. In some embodiments, a deflector may be controlled to adjust a pitch of probe spots (e.g., 102_1S, 102_2S, and 102_3S) formed on a surface of sample 1. As referred to herein, pitch of the probe spots may be defined as the distance between two immediately adjacent probe spots on the surface of sample 1.

A centrally located deflector of image-forming element array may be aligned with primary optical axis 100_1 of electron beam tool 40. Thus, in some embodiments, a central deflector may be configured to maintain the trajectory of beamlet 102_1 to be straight. In some embodiments, the central deflector may be omitted. However, in some embodiments, primary electron source 101 may not necessarily be aligned with the center of source conversion unit 120. Furthermore, it is appreciated that while FIG. 2 shows a side view of apparatus 40 where beamlet 102_1 is on primary optical axis 100_1, beamlet 102_1 may be off primary optical axis 100_1 when viewed from a different side. That is, in some embodiments, all of beamlets 102_1, 102_2, and 102_3 may be off-axis. An off-axis component may be offset relative to primary optical axis 100_1.

The deflection angles of the deflected beamlets may be set based on one or more criteria. In some embodiments, deflectors may deflect off-axis beamlets radially outward or away (not illustrated) from primary optical axis 100_1. In some embodiments, deflectors may be configured to deflect off-axis beamlets radially inward or towards primary optical axis 100_1. Deflection angles of the beamlets may be set so that beamlets 102_1, 102_2, and 102_3 land perpendicularly on sample 1. Off-axis aberrations of images due to lenses, such as objective lens 131, may be reduced by adjusting paths of the beamlets passing through the lenses. Therefore, deflection angles of off-axis beamlets 102_2 and 102_3 may be set so that probe spots 102_2S and 102_3S have small aberrations. Beamlets may be deflected so as to pass through or close to the front focal point of objective lens 131 to decrease aberrations of off-axis probe spots 102_2S and 102_3S. In some embodiments, deflectors may be set to make beamlets 102_1, 102_2, and 102_3 land perpendicularly on sample 1 while probe spots 102_1S, 102_2S, and 102_3S have small aberrations.

Condenser lens 110 is configured to focus primary electron beam 102. The electric currents of beamlets 102_1, 102_2, and 102_3 downstream of source conversion unit 120 can be varied by adjusting the focusing power of condenser lens 110 or by changing the radial sizes of the corresponding beam-limit apertures within the beam-limit aperture array. The electric currents may be changed by both, altering the radial sizes of beam-limit apertures and the focusing power of condenser lens 110. Condenser lens 110 may be an adjustable condenser lens that may be configured so that the position of its first principle plane is movable. The adjustable condenser lens may be configured to be magnetic, which may result in off-axis beamlets 102_2 and 102_3 illuminating source conversion unit 120 with rotation angles. The rotation angles may change with the focusing power or the position of the first principal plane of the adjustable condenser lens. Accordingly, condenser lens 110 may be an anti-rotation condenser lens that may be configured to keep the rotation angles unchanged while the focusing power of condenser lens 110 is changed. In some embodiments, condenser lens 110 may be an adjustable anti-rotation condenser lens, in which the rotation angles do not change when the focusing power and the position of the first principal plane of condenser lens 110 are varied.

Electron beam tool 40 may comprise pre-beamlet forming mechanism 172. In some embodiments, electron source 101 may be configured to emit primary electrons and form a primary electron beam 102. In some embodiments, gun aperture plate 171 may be configured to block off peripheral electrons of primary electron beam 102 to reduce the Coulomb effect. In some embodiments, pre-beamlet-forming mechanism 172 further cuts the peripheral electrons of primary electron beam 102 to further reduce the Coulomb effect. Primary electron beam 102 may be trimmed into three primary electron beamlets 102_1, 102_2, and 102_3 (or any other number of beamlets) after passing through pre-beamlet forming mechanism 172. Electron source 101, gun aperture plate 171, pre-beamlet forming mechanism 172, and condenser lens 110 may be aligned with a primary optical axis 100_1 of electron beam tool 40.

Pre-beamlet forming mechanism 172 may comprise a Coulomb aperture array. A center aperture, also referred to herein as the on-axis aperture, of pre-beamlet-forming mechanism 172 and a central deflector of source conversion unit 120 may be aligned with primary optical axis 100_1 of electron beam tool 40. Pre-beamlet-forming mechanism 172 may be provided with a plurality of pre-trimming apertures (e.g., a Coulomb aperture array). In FIG. 2, the three beamlets 102_1, 102_2 and 102_3 are generated when primary electron beam 102 passes through the three pre-trimming apertures, and much of the remaining part of primary electron beam 102 is cut off. That is, pre-beamlet-forming mechanism 172 may trim much or most of the electrons from primary electron beam 102 that do not form the three beamlets 102_1, 102_2 and 102_3. Pre-beamlet-forming mechanism 172 may cut off electrons that will ultimately not be used to form probe spots 102_1S, 102_2S and 102_3S before primary electron beam 102 enters source conversion unit 120. In some embodiments, a gun aperture plate 171 may be provided close to electron source 101 to cut off electrons at an early stage, while pre-beamlet forming mechanism 172 may also be provided to further cut off electrons around a plurality of beamlets. Although FIG. 2 demonstrates three apertures of pre-beamlet forming mechanism 172, it is appreciated that there may be any number of apertures, as appropriate.

In some embodiments, pre-beamlet forming mechanism 172 may be placed below condenser lens 110. Placing pre-beamlet forming mechanism 172 closer to electron source 101 may more effectively reduce the Coulomb effect. In some embodiments, gun aperture plate 171 may be omitted when pre-beamlet forming mechanism 172 is able to be located sufficiently close to source 101 while still being manufacturable.

Objective lens 131 may be configured to focus beamlets 102_1, 102_2, and 102_3 onto a sample 1 for inspection and can form three probe spots 102_1s, 102_2s, and 102_3s on surface of sample 1. Gun aperture plate 171 can block off peripheral electrons of primary electron beam 102 not in use to reduce Coulomb interaction effects. Coulomb interaction effects can enlarge the size of each of probe spots 102_1s, 102_2s, and 102_3s, and therefore deteriorate inspection resolution.

Beam separator 160 may be a beam separator of Wien filter type comprising an electrostatic deflector generating an electrostatic dipole field E1 and a magnetic dipole field B1 (both of which are not shown in FIG. 2). If they are applied, the force exerted by electrostatic dipole field E1 on an electron of beamlets 102_1, 102_2, and 102_3 is equal in magnitude and opposite in direction to the force exerted on the electron by magnetic dipole field B1. Beamlets 102_1, 102_2, and 102_3 can therefore pass straight through beam separator 160 with zero deflection angles.

Deflection scanning unit 132 can deflect beamlets 102_1, 102_2, and 102_3 to scan probe spots 102_1s, 102_2s, and 102_3s over three small scanned areas in a section of the surface of sample 1. In response to incidence of beamlets 102_1, 102_2, and 102_3 at probe spots 102_1s, 102_2s, and 102_3s, three secondary electron beams 102_1se, 102_2se, and 102_3se may be emitted from sample 1. Each of secondary electron beams 102_1se, 102_2se, and 102_3se can comprise electrons with a distribution of energies including secondary electrons (energies ≤50 eV) and backscattered electrons (energies between 50 eV and landing energies of beamlets 102_1, 102_2, and 102_3). Beam separator 160 can direct secondary electron beams 102_1se, 102_2se, and 102_3se towards secondary imaging system 150. Secondary imaging system 150 can focus secondary electron beams 102_1se, 102_2se, and 102_3se onto detection elements 140_1, 1402, and 140_3 of electron detection device 140. Detection elements 1401, 1402, and 140_3 can detect corresponding secondary electron beams 102_1se, 102_2se, and 102_3se and generate corresponding signals used to construct images of the corresponding scanned areas of sample 1.

In FIG. 2, three secondary electron beams 102_1se, 102_2se, and 102_3se respectively generated by three probe spots 102_1S, 102_2S, and 102_3S, travel upward towards electron source 101 along primary optical axis 100_1, pass through objective lens 131 and deflection scanning unit 132 in succession. The three secondary electron beams 102_1se, 102_2se and 102_3se are diverted by beam separator 160 (such as a Wien Filter) to enter secondary imaging system 150 along secondary optical axis 150_1 thereof. Secondary imaging system 150 focuses the three secondary electron beams 102_1se-102_3se onto electron detection device 140 which comprises three detection elements 140_1, 140_2, and 140_3. Therefore, electron detection device 140 can simultaneously generate the images of the three scanned regions scanned by the three probe spots 102_1S, 102_2S and 102_3S, respectively. In some embodiments, electron detection device 140 and secondary imaging system 150 form one detection unit (not shown). In some embodiments, the electron optics elements on the paths of secondary electron beams such as, but not limited to, objective lens 131, deflection scanning unit 132, beam separator 160, secondary imaging system 150 and electron detection device 140, may form one detection system.

In some embodiments, controller 50 may comprise an image processing system that includes an image acquirer (not shown) and a storage (not shown). The image acquirer may comprise one or more processors. For example, the image acquirer may comprise a computer, server, mainframe host, terminals, personal computer, any kind of mobile computing devices, and the like, or a combination thereof. The image acquirer may be communicatively coupled to electron detection device 140 of apparatus 40 through a medium such as an electrical conductor, optical fiber cable, portable storage media, IR, Bluetooth, internet, wireless network, wireless radio, among others, or a combination thereof. In some embodiments, the image acquirer may receive a signal from electron detection device 140 and may construct an image. The image acquirer may thus acquire images of sample 1. The image acquirer may also perform various post-processing functions, such as generating contours, superimposing indicators on an acquired image, and the like. The image acquirer may be configured to perform adjustments of brightness and contrast, etc. of acquired images. In some embodiments, the storage may be a storage medium such as a hard disk, flash drive, cloud storage, random access memory (RAM), other types of computer readable memory, and the like. The storage may be coupled with the image acquirer and may be used for saving scanned raw image data as original images, and post-processed images.

In some embodiments, the image acquirer may acquire one or more images of a sample based on one or more imaging signals received from electron detection device 140. An imaging signal may correspond to a scanning operation for conducting charged particle imaging. An acquired image may be a single image comprising a plurality of imaging areas or may involve multiple images. The single image may be stored in the storage. The single image may be an original image that may be divided into a plurality of regions. Each of the regions may comprise one imaging area containing a feature of sample 1. The acquired images may comprise multiple images of a single imaging area of sample 1 sampled multiple times over a time sequence or may comprise multiple images of different imaging areas of sample 1. The multiple images may be stored in the storage. In some embodiments, controller 50 may be configured to perform image processing steps with the multiple images of the same location of sample 1.

In some embodiments, controller 50 may include measurement circuitries (e.g., analog-to-digital converters) to obtain a distribution of the detected secondary electrons. The electron distribution data collected during a detection time window, in combination with corresponding scan path data of each of primary beamlets 102_1, 102_2, and 102_3 incident on the wafer surface, can be used to reconstruct images of the wafer structures under inspection. The reconstructed images can be used to reveal various features of the internal or external structures of sample 1, and thereby can be used to reveal any defects that may exist in the wafer.

In some embodiments, controller 50 may control a motorized stage (not shown) to move sample 1 during inspection. In some embodiments, controller 50 may enable the motorized stage to move sample 1 in a direction continuously at a constant speed. In other embodiments, controller 50 may enable the motorized stage to change the speed of the movement of sample 1 over time depending on the steps of scanning process. In some embodiments, controller 50 may adjust a configuration of primary projection optical system 130 or secondary imaging system 150 based on images of secondary electron beams 102_1se, 102_2se, and 102_3se.

Although FIG. 2 shows that electron beam tool 40 uses three primary electron beams, it is appreciated that electron beam tool 40 may use two or more number of primary electron beams. The present disclosure does not limit the number of primary electron beams used in apparatus 40.

Figure 3:
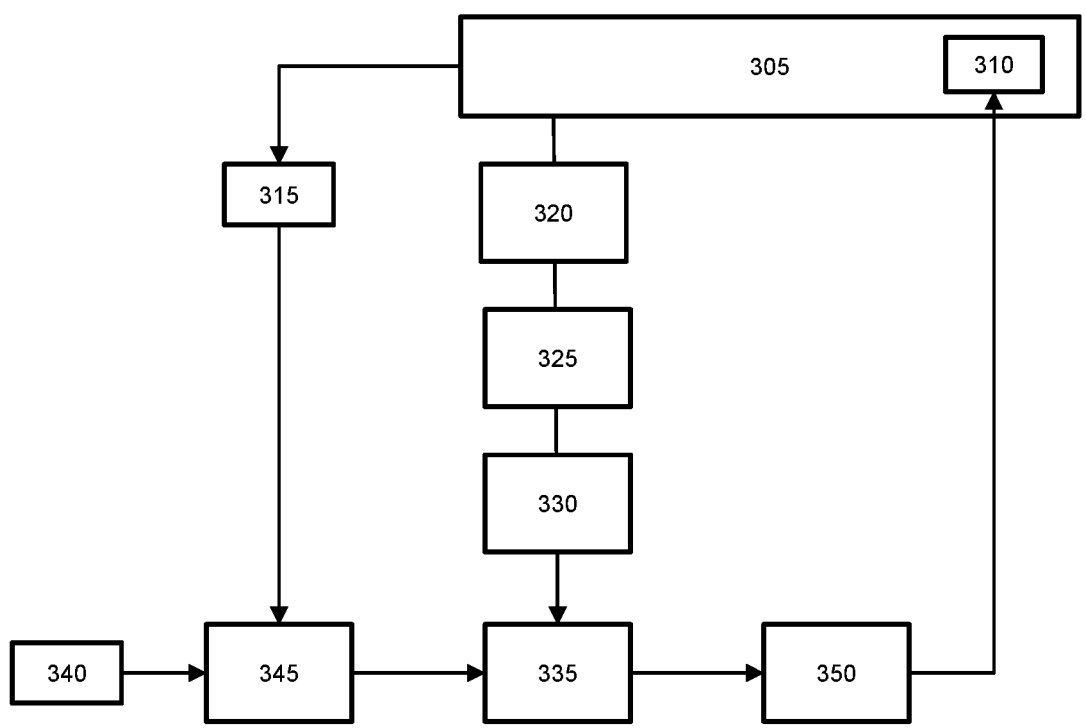
FIG. 3 is a schematic diagram illustrating a semiconductor processing system, consistent with embodiments of the present disclosure.

Reference is now made to FIG. 3, which is a schematic diagram illustrating a semiconductor processing system. FIG. 3 illustrates a conventional semiconductor processing system 300 having a scanner 305, a development tool 320, an etching tool 325, an ash tool 330, a monitoring tool 335, a point determination tool 345, and a verification unit 350. The scanner 305 may include a control unit 310. The semiconductor processing system 300 may aid in a computer guided inspection of a substrate, as described below.

The scanner 305 may expose a substrate coated with photoresist to a circuit pattern to be transferred to the substrate. The control unit 310 may control an exposure recipe used to expose the substrate. The control unit 310 may adjust various exposure recipe parameters, for example, exposure time, source intensity, and exposure dose. A high density focus map (HDFM) 315 may be recorded corresponding to the exposure.

The development tool 320 may develop the pattern on the exposed substrate by removing the photoresist from unwanted regions. For a positive photoresist, the portion of the photoresist that is exposed to light in scanner 305 becomes soluble to the photoresist developer and the unexposed portion of the photoresist remains insoluble to the photoresist developer. For a negative photoresist, the portion of the photoresist that is exposed to light in scanner 305 becomes insoluble to the photoresist developer and the unexposed portion of the photoresist remains soluble to the photoresist developer.

The etching tool 325 may transfer the pattern to one or more films under the photoresist by etching the films from portions of the substrate where the photoresist has been removed. Etching tool 325 can be a dry etch or wet etch tool.

The ash tool 330 can remove the remaining photoresist from the etched substrate and the pattern transfer process to the film on the substrate can be completed.

The monitoring tool 335 may inspect the processed substrate at one or more locations on the substrate to generate monitor results. The monitor results may be based on spatial pattern determination, size measurement of different pattern features or a positional shift in different pattern features. The inspection locations can be determined by the point determination tool 345. In some embodiments, the monitoring tool is part of the EBI system 100 of FIG. 1 or may be the electron beam tool 40.

The point determination tool 345 may include one or more prediction models to determine the inspection locations on the substrate based on the HDFM 315 and weak point information 340. In some embodiments, the point determination tool 345 may generate a prediction for each of the locations on the substrate that predicts a likelihood of the location being a defective (or non-defective) location. For example, the point determination tool 345 may assign a probability value to each of the locations that indicates a probability that the location is a defective (or non-defective) location.

The weak point information 340 may include information regarding locations with a high probability of problems related to the patterning process. The weak point information 340 may be based on the transferred pattern, various process parameters and properties of the wafer, scanner 305, or etching tool 325.

The verification unit 350 may compare the monitor results from monitoring tool 335 with corresponding design parameters to generate verified results. The verification unit 350 may provide the verified results to the control unit 310 of scanner 305. The control unit 310 may adjust the exposure recipe for subsequent substrates based on the verified results. For example, the control unit 310 may decrease exposure dose of scanner 305 for some locations on subsequent substrates based on the verified results.

While the foregoing description describes the semiconductor processing system 300 as having the scanner 305, the development tool 320, the etching tool 325, the ash tool 330, the semiconductor processing system 300 is not restricted to the foregoing tools and may have additional tools that aid in printing a pattern on the substrate. In some embodiments, two or more tools may be combined to form a composite tool that provides functionalities of multiple tools. Additional details with respect to the semiconductor processing system 300 may be found in U.S. Patent Publication No. 2019/0187670, which is incorporated by reference in its entirety.

The following paragraphs describe an improved defect location prediction model 405 that predicts defective locations on a substrate with greater accuracy than prior tools (e.g., point determination tool 345). In some embodiments, the defect location prediction model 405 is trained using an active learning technique to generate predictions with greater accuracy. In the active learning technique, a trained defect location prediction model 405 (e.g., that is trained using an initial dataset) is not only used to generate predictions regarding defective locations on a substrate to be inspected, but is also further trained using actual inspection results of the predicted locations (e.g., obtained from an inspection system) to update the defect location prediction model 405 based on the actual inspection results of the predicted locations. Such a training process may be performed incrementally, e.g., with actual inspection results for every substrate that is subsequently analyzed by the defect location prediction model 405, which may result in an improvement of a prediction accuracy of the defect location prediction model 405. The active learning-based defect location identification method is described at least with reference to FIGS. 4 and 7 below.

Figure 4:
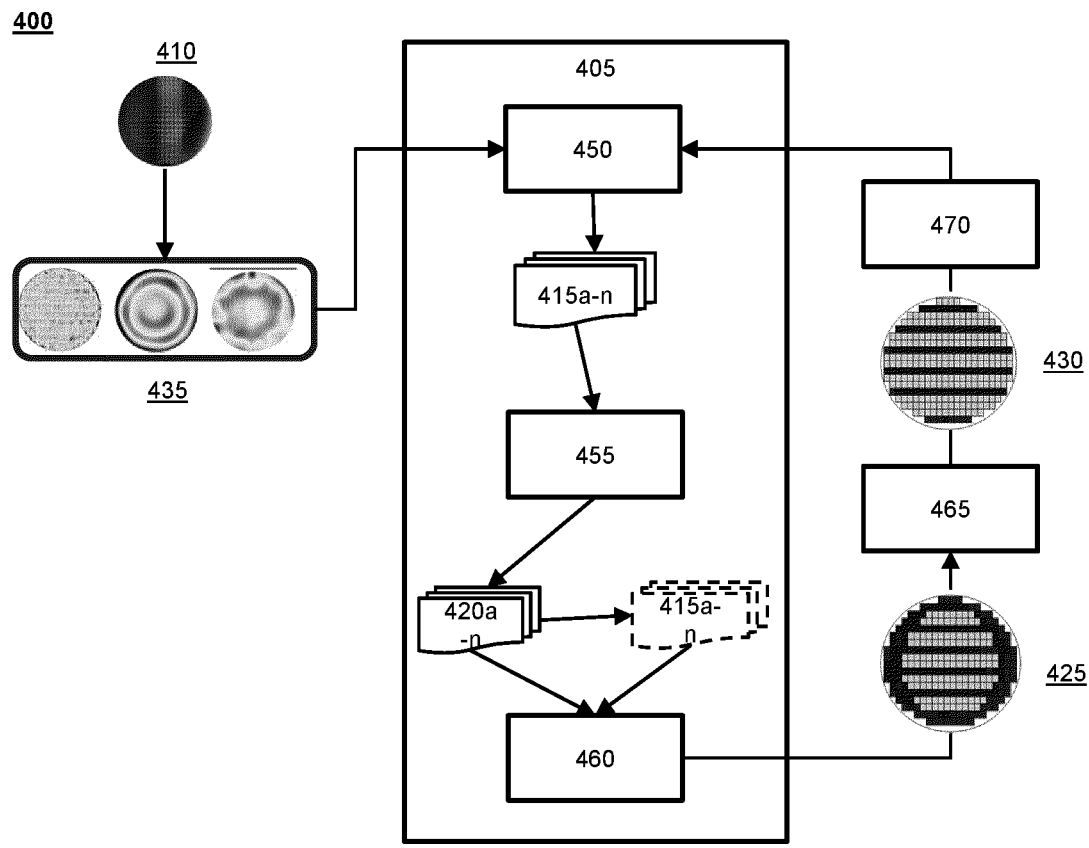
FIG. 4 is a block diagram of a system for predicting defective locations on a substrate, consistent with embodiments of the present disclosure.

FIG. 4 is a block diagram of a system 400 for predicting defective locations on a substrate 410, consistent with various embodiments of the present disclosure. The system 400 includes a defect location prediction model 405, an inspection tool 465 and a feedback tool 470. The defect location prediction model 405 includes a location prediction model 450, a confidence model 455, and a location selection component 460. In some embodiments, prior to generating the predictions for a substrate (e.g., substrate 410), the defect location prediction model 405 is trained using an initial training dataset, which is described at least with reference to FIG. 6.

In some embodiments, the location prediction model 450 is a machine learning (ML) model and is similar to the point determination tool 345 of FIG. 3. The location prediction model 450 generates predictions 415$a$-$n$ for a number of locations, n, on a substrate 410 indicating whether a location is likely to be a defective location or a non-defective location. A prediction 415$a$ associated with a "location a" on the substrate 410 may include a likelihood of whether the "location a" is a defective location or a non-defective location. For example, the prediction may include a probability of "0.8," which indicates that there is a "80%" likelihood that the "location a" has a defect and "20%" likelihood that the "location a" does not have a defect. Accordingly, the location prediction model 450 may classify the "location a" as a defective location. Other types of classification techniques, which do not use probability values, may be used to classify the locations into defective locations and non-defective locations. In some embodiments, the location prediction model 450 generates the prediction 415$a$ based on process-related data 435 associated with the substrate 410. In some embodiments, the process-related data 435 may be similar to the weak point information 340. The process-related data 435 may include data associated with various tools and processes of the semiconductor processing system 300 such as the development tool 320, the etching tool 325, the ash tool 330, or other processes. For example, the process-related data 435 may include metrology data such as critical dimension (CD) measurements, aberrations, edge placement errors (EPE), thickness of film on the substrate 410, or other such data that may contribute to a defect.

In some embodiments, the confidence model 455 is an ML model. The confidence model 455 analyzes the process related data 435 and generates confidence scores 420$a$-$n$ that indicate a level of confidence in the predictions 415$a$-$n$ generated for each of the locations by the location prediction model 450. For example, a confidence score 420*a* indicates a level of confidence in the prediction 415*a* that the "location a" is defective. The confidence model 455 may use any of a number of scales in generating a confidence score. For example, the confidence score 420*a* can be a value in a range of "0" to "1" in which the higher the value the higher is the confidence of the prediction. In some embodiments, the confidence model 455 may assign a higher confidence score if the process-related data 435 is similar to any of the previously analyzed process-related data or assign a lower confidence score if the process-related data 435 is not similar to any of the previously analyzed process-related data. A confidence score may be determined using any of a number of active learning methods. For example, the confidence score may be determining using a random forest model, as described below with reference to FIG. 5A, or using a querying by committee (QBC) active learning method, as described below with reference to FIG. 5B.

Figure 5A:
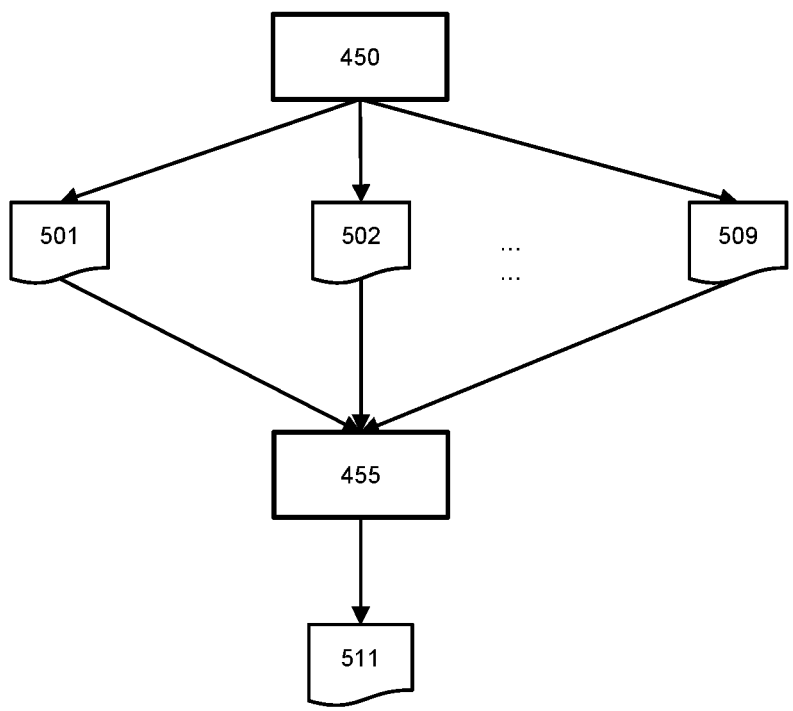
FIG. 5A is a block diagram for determining a confidence score using a random forest model, consistent with embodiments of the present disclosure.

FIG. 5A is a block diagram for determining a confidence score using a random forest model, consistent with embodiments of the present disclosure. In the random forest model, the location prediction model 450 generates a number of predictions, e.g., prediction 501—prediction 509, for each location, and the confidence model 455 determines the confidence score for that location as a function of the predictions 501-509, e.g., based on a variance 511 of all the predictions. Additional details with respect to random forest model may be found in the article G. A. Susto, "A dynamic sampling strategy based on confidence level of virtual metrology predictions", *Proc. 28th Annu. SEMI Adv. Semiconductor Manuf Conf.* (*ASMC*), May 2017, which is hereby incorporated by reference in its entirety.

Figure 5B:
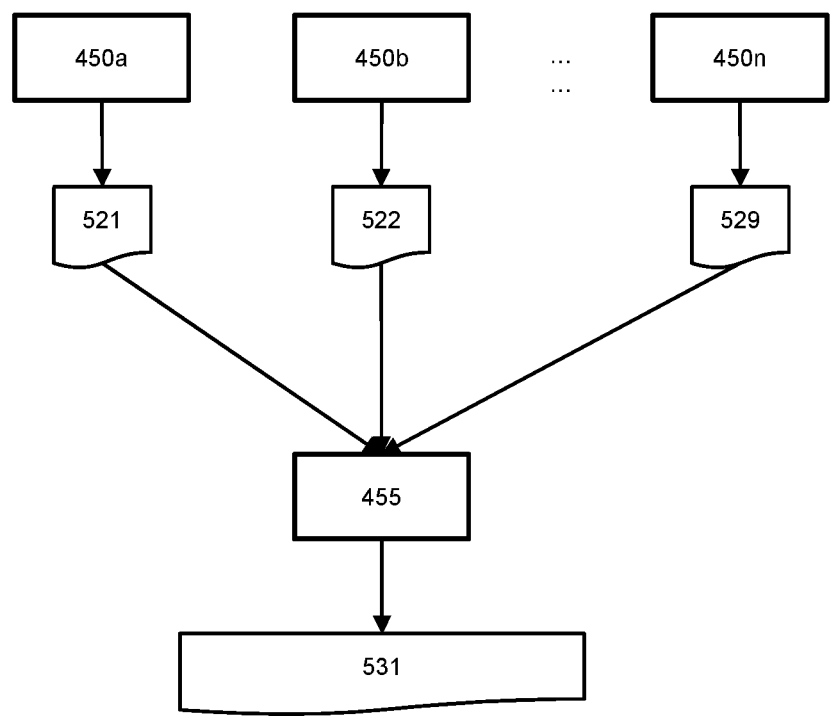
FIG. 5B is a block diagram for determining a confidence score using a query by committee method, consistent with embodiments of the present disclosure.

FIG. 5B is a block diagram for determining a confidence score using a QBC method, consistent with embodiments of the present disclosure. In the QBC method, a number of location prediction models 450*a-n* (e.g., a diverse committee of location predication models 450*a-n*) may be used to generate predictions, e.g., prediction 521 to prediction 529, for each location on the substrate 410. The confidence model 455 may determine a confidence score as a function of the predictions 521-529, e.g., based on a variance 531 of predictions 521-529. For example, the confidence model 455 obtains a prediction for a "location a" from each location prediction model 450*a-n* of the committee and then calculate the confidence score 531 as a variance of the predictions 521-529 obtained from the committee. Additional details with respect to the QBC active learning method and other active learning methods may found in the articles titled "Committee-based sampling for training probabilistic classifiers," Dagan, I., & Engelson, S. P. (1995), *Proc. of 12th Intl. Conf. on Machine Learning* (*ICML*-95); "Employing EM and pool-based active learning for text classification," McCallum, A., & Nigam, K. (1998), *Proc. of 15th Intl. Conf. on Machine Learning* (*ICML*-98); "Query learning strategies using boosting and bagging," Abe, N., & Mamitsuka, H. (1998), *Proc. of 15th Intl. Conf. on Machine Learning* (*ICML*-98); and an electronic book titled "An introduction to active learning," Jennifer Prendki, (2018), all of which are hereby incorporated by reference in their entirety.

Referring back to FIG. 4, the location selection component 460 selects all those locations on the substrate 410 associated with a prediction having a confidence score satisfying location selection criteria. For example, the location selection component 460 may select all those locations that are predicted to be defective and are associated with a confidence score exceeding a first confidence threshold. In another example, the location selection component 460 may select all those locations associated with a confidence score below a second confidence threshold regardless of whether those locations are predicted to be defective or non-defective. The location selection component 460 may add the selected locations to a sampling plan 425, which may be input to an inspection tool 465 for inspecting the selected locations. The sampling plan 425 may include information regarding the locations on the substrate 410 (e.g., (x, y) coordinates) that are to be inspected by the inspection tool 465. The inspection tool 465 may inspect the locations of the substrate 410 based on the sampling plan 425 and output the actual inspection results 430 (e.g., not predicted) for the inspected locations. In some embodiments, the inspection results 430 may include an image of an inspected location (e.g., SEM image), location information of the inspected location (e.g., (x, y) coordinates) and whether that location is found to be defective or non-defective. In some embodiments, the inspection tool 465 may include the monitoring tool 335 of FIG. 3 or the electron beam tool 40 of FIG. 1 for performing the inspection, and may include the verification unit 350 that compares the inspection results 430 with design parameters of a pattern to be printed on the substrate 410 to generate the inspection results 430.

The feedback tool 470 may input the inspection results 430 along with the process-related data of those locations back to the defect location prediction model 405 to further train the defect location prediction model 405 with the actual inspection results 430 of the selected locations. By training the defect location prediction model 405 with the actual inspection results from the inspection tool 465, a cost function of the defect location prediction model 405 may reduce and a prediction accuracy of the defect location prediction model 405 may improve (e.g., increase). In some embodiments, the cost function may be indicative of a deviation between the predictions and the actual inspection results 430, and the prediction accuracy may be indicative of a number of correct predictions compared to a total number of predictions. By incrementally training the defect location prediction model 405 (e.g., training the defect location prediction model 405 with the actual inspection results from the inspection tool 465 every time a prediction is made for a new or a different substrate), the cost function is minimized and thus, the prediction accuracy is maximized. As the prediction accuracy improves, the defect location prediction model 405 may predict locations that are likely to be defective with a greater confidence.

In some embodiments, the location selection component 460 may be configured to control a selection of the locations for inspection (e.g., by adjusting one or more confidence thresholds). For example, when the prediction accuracy of the defect location prediction model 405 is below an accuracy threshold, the location selection component 460 may have a greater first confidence threshold so that locations that are predicted to be defective with high confidence scores (e.g., s>x, where s is the score and x is a first confidence threshold) are selected for inspection while those with lower confidence scores (e.g., s<x) are ignored. As the prediction accuracy improves, the location selection component 460 may decrease the first confidence threshold so that locations that are predicted to be defective with even lower confidence scores (e.g., s>y and y<x, where y is the adjusted first confidence threshold) are selected for inspection. In another example, when the prediction accuracy of the defect location prediction model 405 is below an accuracy threshold, the location selection component 460 may have a greater second confidence threshold so that locations which are associated with lower confidence scores (e.g., s<a and a<x, where a is a second confidence threshold) are selected for inspection regardless of whether they are predicted to be defective or non-defective. As the prediction accuracy improves, the location selection component 460 may decrease the second confidence threshold so that locations that are predicted to be defective with very low confidence scores (e.g., s<b and b<a, where b is a second confidence threshold) are selected for inspection. In some embodiments, the location selection component 460 may also be configured to control the selection of the locations for inspection based on the available resources (e.g., time and computing resources of the inspection tool 465) for inspection. The location selection component 460 may adjust the confidence thresholds according to the available resources. For example, the lower the available resources, the lesser is the number of locations selected for inspection. In some embodiments, the confidence thresholds, the accuracy threshold, the available resources, or the number of locations to be inspected may be user configurable.

Figure 6:
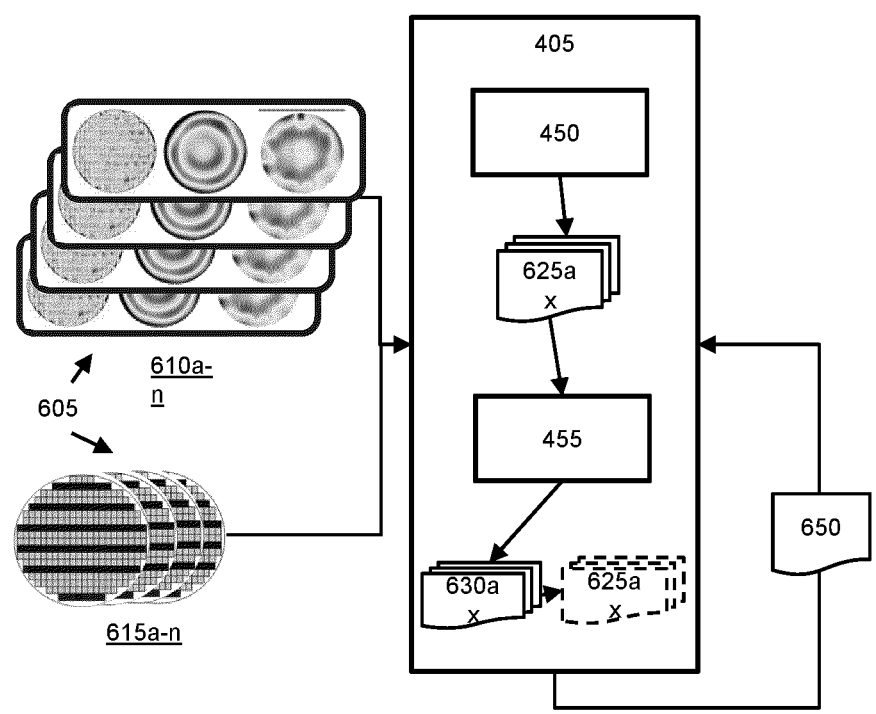
FIG. 6 is a block diagram illustrating training of the defect location prediction tool using an initial training dataset, consistent with embodiments of the present disclosure.

FIG. 6 is a block diagram illustrating training of the defect location prediction model 405 using an initial training dataset, consistent with various embodiments of the present disclosure. The defect location prediction model 405 may have to be trained using an initial training dataset 605 before it can be used to generate predictions for a substrate, such as the substrate 410 of FIG. 4. The initial training dataset 605 may be a labeled dataset, which includes process-related data 610a-n and inspection results 615a-n of "n" number of substrates. For example, for a substrate "A," the initial training dataset 605 may include process-related data 610a and inspection results 615a associated with the substrate "A." In some embodiments, the process-related data 610a may be similar to the process-related data 435 and may include metrology data such as CD measurements, aberrations, EPE, thickness of film on the substrate "A", or other such data that may contribute to a defect. In some embodiments, the inspection results 615a may be similar to the inspection results 430 and may include an image of an inspected location (e.g., SEM image), location information of the inspected location (e.g., (x, y) coordinates) and whether that location is found to be defective or non-defective. The labeled dataset may be obtained from various sources, including tools of the semiconductor processing system 300 of FIG. 3.

The location prediction model 450 and the confidence model 455, as mentioned above at least with reference to FIG. 4, may be ML models. The training of the defect location prediction model 405 may be an iterative process in which each iteration may involve analyzing process-related data 610 associated with a substrate, determining the cost functions and updating a configuration of the defect location prediction model 405 based on the cost function, all of which are described below in greater detail. In some embodiments, the defect location prediction model 405 may be trained in a "batch" fashion instead of as an iterative process. For example, the training dataset 605 having process-related data 610a-n and inspection results 615a-n of "n" number of substrates may be input collectively. Upon inputting the process-related data 610a and inspection results 615a, the location prediction model 450 generates predictions 625a1-625ax for "x" number of locations on the substrate "A" and the confidence model assigns confidence scores 630a1-630ax for the predictions 625a1-625ax, respectively. The defect location prediction model 405 then compares the predicted results with the inspection results 615a to determine a cost function 650 of the defect location prediction model 405, which may be indicative of a deviation between the predicted results 625a1-625ax and the actual inspection results 615a. The defect location prediction model 405 may update its configurations (e.g., weights, biases, or other parameters of location prediction model 450 or the confidence model 455) based on the cost function 650 or other reference feedback information (e.g., user indication of accuracy, reference labels, or other information) to minimize the cost function 650. The above process is repeated iteratively with process-related data and inspection results associated with a different substrate in each iteration until a termination condition is satisfied. The termination condition may include a predefined number of iterations, cost function satisfies a specified threshold, or other such conditions. After the termination condition is satisfied, the defect location prediction model 405 may be considered to be "trained" and may be used for identifying or predicting defective locations in a new substrate (e.g., a substrate that has not been analyzed using the defect location prediction model 405 yet).

In some embodiments, although the trained defect location prediction model 405 may be used to predict defective locations in a new substrate, such as a substrate 410, the trained defect location prediction model 405 may be further trained using active learning ML method to further improve the prediction accuracy. In the active learning ML method, the trained defect location prediction model 405 is trained with selectively labeled data, e.g., actual inspection results of the locations for which predictions are generated using the trained defect location prediction model 405, to further improve the prediction accuracy, e.g., especially in cases where the defect location prediction model 405 is analyzing process-related data that is not similar to any of the previously analyzed (either during the training of the defect location prediction model 405 or during the actual prediction of defect location) process-related data. Such active learning methods may overcome a "concept drift" problem, a scenario in which if the ML model may become stale and the accuracy may degrade if it is not updated on a regular basis with new training data. In the semiconductor processing fields, the fabrication processes may change continuously and therefore, the process-related data associated with the substrate may also change. In some embodiments, even if the process-related data is not drifting, the relationship between the process-related data and defect/non-defect label may drift as a function of time (e.g., caused by some hidden process variable that may not be available to the ML model). If the trained defect location prediction model 405 is input with process-related data that is not similar to, or is significantly different from, the previously analyzed process-related data the predictions generated from the defect location prediction model 405 may not be accurate. By incrementally training the trained defect location prediction model 405 (e.g., as described at least with reference to FIG. 4) with the actual inspection results of the locations for which predictions are generated using the trained defect location prediction model 405, the "concept drift" problem may be overcome and the prediction accuracy may be improved.

Figure 7:
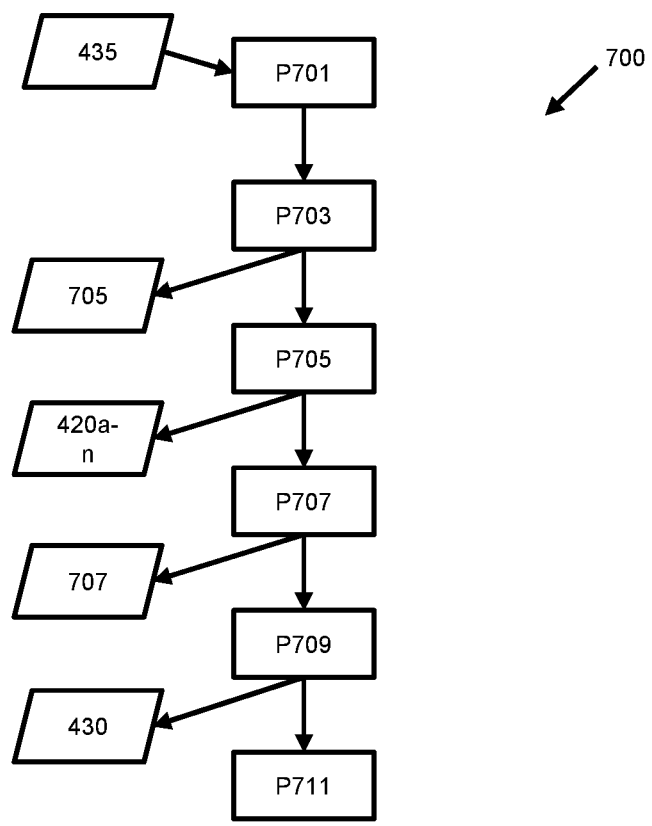
FIG. 7 is a flow diagram of a process for predicting defective locations on a substrate, consistent with embodiments of the present disclosure.

FIG. 7 is a flow diagram of a process 700 for predicting defective locations on a substrate, consistent with embodiments of the present disclosure. In some embodiments, the process 700 may be implemented in the system 400 of FIG. 4. At operation P701, process-related data associated with a substrate is input to the defect location prediction model 405. For example, the process-related data 435 associated with the substrate 410 that includes metrology data such as CD measurements, aberrations, EPE, thickness of film on the substrate 410, or other such data that may con0tribute to a defect may be input to the defect location prediction model 405.

At operation P703, locations 705 on the substrate 410 to be inspected may be selected based on the predictions generated by the location prediction model 450. For example, the location prediction model 450 generates predictions 415*a-n* for a number of locations, n, on the substrate 410 indicating whether a location is likely to be a defective location or a non-defective location. In some embodiments, the location prediction model 450 is initially trained using an initial training dataset to predict defective locations, as described at least with reference to FIG. 6.

At operation P705, confidence scores 420*a-n* are generated for each of the predictions associated with locations 705. A confidence score may indicate a level of confidence in the corresponding prediction. For example, a confidence score 420*a* indicates a level of confidence in the prediction 415*a* that a "location a" is defective. In some embodiments, the higher the confidence score the higher is the confidence in the associated prediction. In some embodiments, the confidence model 455 may assign a higher confidence score if the process-related data 435 is similar to any of the previously analyzed process-related data or assign a lower confidence score otherwise. A confidence score may be determined using any of a number of active learning methods. For example, the confidence score may be determining using a random forest model, as described at least with reference to FIG. 5A, or using a QBC active learning method, as described at least with reference to FIG. 5B.

At operation P707, those of the locations 705 associated with a prediction having a confidence score satisfying location selection criteria are added to a set of locations 707 to be inspected by the inspection tool 465. For example, the location selection component 460 may add all those locations 705 that are predicted to be defective and are associated with a confidence score exceeding a first confidence threshold to the set of locations 707. In another example, the location selection component 460 may add all those locations associated with a confidence score below a second confidence threshold to the set of locations 707 regardless of whether the prediction for those locations is defective or non-defective.

At operation P709, inspection results 430 are obtained for the set of locations 707 from the inspection tool 465. The location selection component 460 may add information (e.g., (x, y) coordinates) regarding the set of locations 707 to a sampling plan 425 and input the sampling plan 425 to the inspection tool 465. The inspection tool 465 may inspect the set of locations 707 on the substrate 410 and output the actual inspection results 430. In some embodiments, the inspection results 430 may include an image of an inspected location (e.g., SEM image), location information of the inspected location (e.g., (x, y) coordinates) and whether that location is found to be defective or non-defective.

At operation P711, the inspection results 430 of the set of locations 707 and the process-related data of those locations are fed back to the defect location prediction model 405 to further train the defect location prediction model 405 with the actual inspection results 430 of the set of locations. In some embodiments, the defect location prediction tool is incrementally trained by performing operations P701 to P711 every time a prediction is made for a new or a different substrate. That is, the defect location prediction model 405 is trained with the actual inspection results from the inspection tool 465 every time a prediction is made for a new or a different substrate. By incrementally training the defect location prediction model 405, the cost function associated with the defect location prediction model 405 is minimized and thus, the prediction accuracy of the defect location prediction model 405 is maximized. As the prediction accuracy improves, the defect location prediction model 405 may predict locations that are likely to be defective with a greater confidence.

Figure 8:
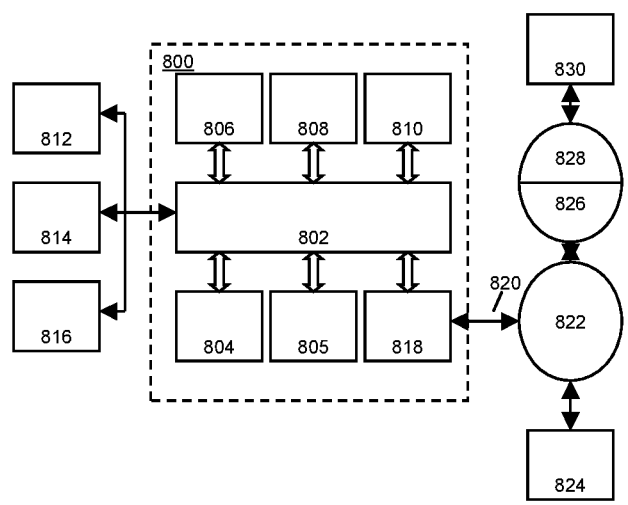
FIG. 8 is a block diagram that illustrates a computer system which can assist in implementing the methods, flows, modules, components, or the apparatus disclosed herein.

FIG. 8 is a block diagram that illustrates a computer system 800 which can assist in implementing the methods, flows, modules, components, or the apparatus disclosed herein. Computer system 800 includes a bus 802 or other communication mechanism for communicating information, and a processor 804 (or multiple processors 804 and 805) coupled with bus 802 for processing information. Computer system 800 also includes a main memory 806, such as a random-access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT) or flat panel or touch panel display for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane. A touch panel (screen) display may also be used as an input device.

According to one embodiment, portions of one or more methods described herein may be performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In an alternative embodiment, hard-wired circuitry may be used in place of or in combination with software instructions. Thus, the description herein is not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media include, for example, optical or magnetic disks, such as storage device 810. Volatile media include dynamic memory, such as main memory 806. Transmission media include coaxial cables, copper wire and fiber optics, including the wires that comprise bus 802. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be borne on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 may also include a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic, or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network, now commonly referred to as the "Internet" 828. Local network 822 and Internet 828 both use electrical, electromagnetic, or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820, and communication interface 818. In the Internet example, a server 830 might transmit a requested code for an application program through Internet 828, ISP 826, local network 822 and communication interface 818. One such downloaded application may provide all or part of a method described herein, for example. The received code may be executed by processor 804 as it is received, and/or stored in storage device 810, or other non-volatile storage for later execution. In this manner, computer system 800 may obtain application code in the form of a carrier wave.

The embodiments may further be described using the following clauses:

1. A non-transitory computer-readable medium having instructions that, when executed by a computer, cause the computer to execute a method for identifying locations to inspect on a substrate, the method comprising:
    selecting a plurality of locations on the substrate to inspect based on a first sub-model of a defect location prediction model that is trained using an initial training dataset associated with other substrates to generate a prediction of defect or non-defect for each of the locations;
    using a second sub-model of the defect location prediction model that is trained using the initial training dataset, generating a confidence score for each of the locations based on process-related data associated with the substrate, wherein the confidence score is indicative of a confidence in the prediction for the corresponding location;
    adding each of the locations for which the confidence score satisfies one of a plurality of confidence thresholds to a set of locations to be inspected by an inspection system;
    obtaining inspection results data; and
    incrementally training the defect location prediction model by providing the inspection results data and process-related data for the set of locations as training data to the defect location prediction model.
2. The computer-readable medium of clause 1, wherein incrementally training the second sub-model is an iterative process in which each iteration includes:
    training the first sub-model using inspection results data and process-related data of a different substrate that has not been inspected in any of prior iterations.
3. The computer-readable medium of clause 1, wherein adding each of the locations includes:
    adding each of the locations to the set of locations when the confidence score of the prediction of defect for the corresponding location exceeds a first confidence threshold of the confidence thresholds.
4. The computer-readable medium of clause 1, wherein adding each of the locations includes:
    adding each of the locations to the set of locations when the confidence score of the prediction of defect or non-defect for the corresponding location is below a second confidence threshold of the confidence thresholds.
5. The computer-readable medium of clause 1 further comprising:
    determining a prediction accuracy of the defect location prediction model based on a number of correct predictions and a total number of predictions.
6. The computer-readable medium of clause 5, wherein incrementally training the defect location prediction model increases the prediction accuracy.
7. The computer-readable medium of clause 5 further comprising:
    adjusting the confidence thresholds based on a change in the prediction accuracy
8. The computer-readable medium of clause 7, wherein adjusting the confidence thresholds includes decreasing a first confidence threshold of the confidence thresholds as the prediction accuracy improves, wherein the first confidence threshold is used to select those of the locations for which the prediction of defect is associated with the confidence score exceeding the first confidence threshold.
9. The computer-readable medium of clause 7, wherein adjusting the confidence thresholds includes decreasing a second confidence threshold of the confidence thresholds as the prediction accuracy improves, wherein the second confidence threshold is used to select those of the locations for which the prediction of defect or non-defect is associated with the confidence score below the second confidence threshold.
10. The computer-readable medium of clause 7, wherein adjusting the confidence thresholds includes increasing a first confidence threshold of the confidence thresholds as the prediction accuracy degrades, wherein the first confidence threshold is used to select those of the locations for which the prediction of defect is associated with the confidence score exceeding the first confidence threshold.
11. The computer-readable medium of clause 7, wherein adjusting the confidence thresholds includes increasing a second confidence threshold of the confidence thresholds as the prediction accuracy degrades, wherein the second confidence threshold is used to select those of the locations for which the prediction of defect or non-defect is associated with the confidence score below the second confidence threshold.
12. The computer-readable medium of clause 1, wherein the first sub-model is configured to generate a probability value for each of the predictions, the probability value indicative of a probability that the corresponding location is a defect location or a non-defect location.
13. The computer-readable medium of clause 1, wherein generating the confidence score includes:
    generating the confidence score for a specified location of the locations based on a comparison of process-related data associated with the specified location and process-related data in the initial training dataset or the training data used to train the defect location prediction model.
14. The computer-readable medium of clause 1, wherein the defect location prediction model includes a plurality of first sub-models, and wherein generating the confidence score includes:
    obtaining, from each of the first sub-models, a probability value associated with the prediction for a specified location of the locations, and
    generating the confidence score for the specified location as a function of the probability values obtained from the first sub-models.
15. The computer-readable medium of clause 1, wherein obtaining the inspection results data includes obtaining the inspection results data from the inspection system.
16. The computer-readable medium of clause 1, wherein the inspection results data includes, for each location of the set of locations, information regarding whether that location has a defect or not.
17. The computer-readable medium of clause 16, wherein the inspection results data indicates that a specified location of the set of locations has a defect based on a number of defects detected in the specified location satisfying a defect threshold.
18. The computer-readable medium of clause 1, wherein the process-related data includes, for each of the locations, data associated with multiple processes involved in forming a pattern on the substrate.
19. The computer-readable medium of clause 18, wherein the data includes metrology data associated with the multiple processes.
20. The computer-readable medium of clause 1, wherein the initial training dataset includes process-related data associated with a plurality of substrates.
21. A non-transitory computer-readable medium having instructions that, when executed by a computer, cause the computer to execute a method for identifying locations to inspect on a first substrate using a machine learning model and for training the machine learning model to identify locations to inspect on a second substrate based on inspection results of the locations on the first substrate, the method comprising:
    inputting process-related data associated with a substrate to a defect location prediction model;
    generating, using the defect location prediction model, a prediction of defect or non-defect for each of a plurality of locations on the substrate, wherein each prediction is associated with a confidence score that is indicative of a confidence in the prediction for the corresponding location;
    adding each of the locations for which the confidence score satisfies one of a plurality of confidence thresholds to a set of locations to be inspected by an inspection system;
    obtaining inspection results data for the set of locations from the inspection system; and
    inputting the inspection results data and process-related data for the set of locations to the defect location prediction model for training the defect location prediction model.
22. The computer-readable medium of clause 21 further comprising:
    incrementally training the defect location prediction model, wherein the incremental training is an iterative process in which each iteration includes:
    training the defect location prediction model using inspection results data and process-related data of a different substrate that has not been inspected in any of prior iterations.
23. The computer-readable medium of clause 21, wherein adding each of the locations includes:
    adding each of the locations to the set of locations when the confidence score of the prediction of defect for the corresponding location exceeds a first confidence threshold of the confidence thresholds.
24. The computer-readable medium of clause 21, wherein adding each of the locations includes:
    adding each of the locations to the set of locations when the confidence score of the prediction of defect or non-defect for the corresponding location is below a second confidence threshold of the confidence thresholds.
25. The computer-readable medium of clause 21 further comprising:
    determining a prediction accuracy of the defect location prediction model based on a number of correct predictions and a total number of predictions.
26. The computer-readable medium of clause 25 further comprising:
    adjusting the confidence thresholds based on a change in the prediction accuracy.
27. The computer-readable medium of clause 21, wherein generating the prediction includes: prior to inputting the process-related data of the substrate, training the defect location prediction model using an initial training dataset associated with other substrates to generate the prediction of defect or non-defect for each of the locations for the corresponding substrate, wherein the initial training dataset includes process-related data of the other substrates.

28. The computer-readable medium of clause 21, wherein generating the prediction includes:
   generating the confidence score for a specified location of the locations based on a comparison of process-related data associated with the specified location and process-related data associated with other substrates used to train the defect location prediction model.

29. The computer-readable medium of clause 21, wherein generating the prediction includes:
   obtaining, from each of a plurality of prediction models, a probability value associated with the prediction of a defect or non-defect for a specified location of the locations, and
   generating the confidence score for the specified location as a function of the probability values obtained from the prediction models.

30. A method for identifying locations to inspect on a first substrate using a machine learning model and for training the machine learning model to identify locations to inspect on a second substrate based on inspection results of the locations on the first substrate, the method comprising:
   inputting process-related data associated with a substrate to a defect location prediction model;
   generating, using the defect location prediction model, a prediction of defect or non-defect for each of a plurality of locations on the substrate, wherein each prediction is associated with a confidence score that is indicative of a confidence in the prediction for the corresponding location;
   adding each of the locations for which the confidence score satisfies a confidence threshold to a set of locations to be inspected by an inspection system;
   obtaining inspection results data for the set of locations from the inspection system; and
   inputting the inspection results data and process-related data for the set of locations to the defect location prediction model for training the defect location prediction model.

31. The method of clause 30 further comprising:
   incrementally training the defect location prediction model, wherein the incremental training is an iterative process in which each iteration includes:
   training the defect location prediction model using inspection results data and process-related data of a different substrate that has not been inspected in any of prior iterations.

32. The method of clause 30, wherein adding each of the locations includes:
   adding each of the locations to the set of locations when the confidence score of the prediction of defect for the corresponding location exceeds a first confidence threshold of the confidence thresholds.

33. The method of clause 30, wherein adding each of the locations includes:
   adding each of the locations to the set of locations when the confidence score of the prediction of defect or non-defect for the corresponding location is below a second confidence threshold of the confidence thresholds.

34. The method of clause 30 further comprising:
   determining a prediction accuracy of the defect location prediction model based on a number of correct predictions and a total number of predictions.

35. The method of clause 34 further comprising:
   adjusting the confidence thresholds based on a change in the prediction accuracy.

36. The method of clause 30, wherein generating the prediction includes:
   prior to inputting the process-related data of the substrate, training the defect location prediction model using an initial training dataset associated with other substrates to generate the prediction of defect or non-defect for each of the locations for the corresponding substrate.

37. The method of clause 30, wherein generating the prediction includes:
   generating the confidence score for a specified location of the locations based on a comparison of process-related data associated with the specified location and process-related data associated with other substrates used to train the defect location prediction model.

38. The method of clause 30, wherein generating the prediction includes:
   obtaining, from each of a plurality of prediction models, a probability value associated with a prediction of a specified location of the locations being a defect or non-defect, and
   generating the confidence score for the specified location as a function of the probability values obtained from the prediction models.

39. An apparatus for identifying locations to inspect on a first substrate using a machine learning model and for training the machine learning model to identify locations to inspect on a second substrate based on inspection results of the locations on the first substrate, the apparatus comprising:
   a memory storing a set of instructions; and
   at least one processor configured to execute the set of instructions to cause the apparatus to perform a method of:
   inputting process-related data associated with a substrate to a defect location prediction model;
   generating, using the defect location prediction model, a prediction of defect or non-defect for each of a plurality of locations on the substrate, wherein each prediction is associated with a confidence score that is indicative of a confidence in the prediction for the corresponding location;
   adding each of the locations for which the confidence score satisfies a confidence threshold to a set of locations to be inspected by an inspection system;
   obtaining inspection results data for the set of locations from the inspection system; and
   inputting the inspection results data and process-related data for the set of locations to the defect location prediction model for training the defect location prediction model.

40. The apparatus of clause 39, wherein the method further comprises:
   incrementally training the defect location prediction model, wherein the incremental training is an iterative process in which each iteration includes:

training the defect location prediction model using inspection results data and process-related data of a different substrate that has not been inspected in any of prior iterations.

41. The apparatus of clause 39, wherein adding each of the locations includes:
   adding each of the locations to the set of locations when the confidence score of the prediction of defect for the corresponding location exceeds a first confidence threshold of the confidence thresholds.

42. The apparatus of clause 39, wherein adding each of the locations includes:
   adding each of the locations to the set of locations when the confidence score of the prediction of defect or non-defect for the corresponding location is below a second confidence threshold of the confidence thresholds.

43. The apparatus of clause 39 further comprising:
   determining a prediction accuracy of the defect location prediction model based on a number of correct predictions and a total number of predictions.

44. The apparatus of clause 43 further comprising:
   adjusting the confidence thresholds based on a change in the prediction accuracy.

45. The apparatus of clause 39, wherein generating the prediction includes:
   prior to inputting the process-related data of the substrate, training the defect location prediction model using an initial training dataset associated with other substrates to generate the prediction of defect or non-defect for each of the locations for the corresponding substrate.

46. The apparatus of clause 39, wherein generating the prediction includes:
   generating the confidence score for a specified location of the locations based on a comparison of process-related data associated with the specified location and process-related data associated with other substrates used to train the defect location prediction model.

47. The apparatus of clause 39, wherein generating the prediction includes:
   obtaining, from each of a plurality of prediction models, a probability value associated with the prediction of defect or non-defect for a specified location of the locations, and
   generating the confidence score for the specified location as a function of the probability values obtained from the prediction models.

48. A non-transitory computer-readable medium having instructions recorded thereon, the instructions when executed by a computer implementing the method of any of the above clauses.

A non-transitory computer readable medium may be provided that stores instructions for a processor of a controller (e.g., controller 50 of FIG. 1) to carry out, among other things, image inspection, image acquisition, stage positioning, beam focusing, electric field adjustment, beam bending, condenser lens adjusting, activating charged-particle source, beam deflecting, and at least a portion of processes 600 and 700. Common forms of non-transitory media include, for example, a floppy disk, a flexible disk, hard disk, solid state drive, magnetic tape, or any other magnetic data storage medium, a Compact Disc Read Only Memory (CD-ROM), any other optical data storage medium, any physical medium with patterns of holes, a Random Access Memory (RAM), a Programmable Read Only Memory (PROM), and Erasable Programmable Read Only Memory (EPROM), a FLASH-EPROM or any other flash memory, Non-Volatile Random Access Memory (NVRAM), a cache, a register, any other memory chip or cartridge, and networked versions of the same.

Relative dimensions of components in drawings may be exaggerated for clarity. Within the description of drawings, the same or like reference numbers refer to the same or like components or entities, and only the differences with respect to the individual embodiments are described. As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It will be appreciated that the embodiments of the present disclosure are not limited to the exact construction that has been described above and illustrated in the accompanying drawings, and that various modifications and changes may be made without departing from the scope thereof. The present disclosure has been described in connection with various embodiments, other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The descriptions above are intended to be illustrative, not limiting. Thus, it will be apparent to one skilled in the art that modifications may be made as described without departing from the scope of the claims set out below.

The invention claimed is:

1. A non-transitory computer-readable medium having instructions that, when executed by a computer system, are configured to cause the computer system to at least:
   select a plurality of locations on the substrate to inspect based on a first sub-model of a defect location prediction model that is trained using an initial training dataset associated with other substrates to generate a prediction of defect or non-defect for each of the locations;
   using a second sub-model of the defect location prediction model that is trained using the initial training dataset, generate a confidence score for each of the locations based on process-related data associated with the substrate, wherein the confidence score is indicative of a confidence in the prediction for the corresponding location;
   add each of the locations for which the confidence score satisfies one of a plurality of confidence thresholds to a set of locations to be inspected by an inspection system;
   obtain inspection results data; and
   incrementally train the defect location prediction model by providing the inspection results data and process-related data for the set of locations as training data to the defect location prediction model.

2. The computer-readable medium of claim 1, wherein the instructions configured to cause the computer system to incrementally train the second sub-model are configured to cause the training in an iterative manner in which each iteration includes training of the first sub-model using inspection results data and process-related data of a different substrate that has not been inspected in any prior iterations.

3. The computer-readable medium of claim 1, wherein the instructions configured to cause the computer system to add each of the locations are configured to cause the computer system to add each of the locations to the set of locations when the confidence score of the prediction of defect for the corresponding location exceeds a first confidence threshold of the confidence thresholds.

4. The computer-readable medium of claim 1, wherein the instructions configured to cause the computer system to add each of the locations are configured to cause the computer system to add each of the locations to the set of locations when the confidence score of the prediction of defect or non-defect for the corresponding location is below a second confidence threshold of the confidence thresholds.

5. The computer-readable medium of claim 1, wherein the instructions are further configured to cause the computer system to determine a prediction accuracy of the defect location prediction model based on a number of correct predictions and a total number of predictions.

6. The computer-readable medium of claim 5, wherein the incremental training of the defect location prediction model increases the prediction accuracy.

7. The computer-readable medium of claim 5, wherein the instructions are further configured to cause the computer system to adjust the confidence thresholds based on a change in the prediction accuracy.

8. The computer-readable medium of claim 7, wherein the instructions configured to cause the computer system to adjust the confidence thresholds are configured to cause the computer system to decrease a first confidence threshold of the confidence thresholds as the prediction accuracy improves, wherein the first confidence threshold is used to select those of the locations for which the prediction of a defect is associated with the confidence score exceeding the first confidence threshold.

9. The computer-readable medium of claim 7, wherein the instructions configured to cause the computer system to adjust the confidence thresholds are configured to cause the computer system to decrease a second confidence threshold of the confidence thresholds as the prediction accuracy improves, wherein the second confidence threshold is used to select those of the locations for which the prediction of defect or non-defect is associated with the confidence score below the second confidence threshold.

10. The computer-readable medium of claim 7, wherein the instructions configured to cause the computer system to adjust the confidence thresholds are configured to cause the computer system to increase a first confidence threshold of the confidence thresholds as the prediction accuracy degrades, wherein the first confidence threshold is used to select those of the locations for which the prediction of defect is associated with the confidence score exceeding the first confidence threshold.

11. The computer-readable medium of claim 7, wherein the instructions configured to cause the computer system to adjust the confidence thresholds are configured to cause the computer system to increase a second confidence threshold of the confidence thresholds as the prediction accuracy degrades, wherein the second confidence threshold is used to select those of the locations for which the prediction of defect or non-defect is associated with the confidence score below the second confidence threshold.

12. The computer-readable medium of claim 1, wherein the first sub-model is configured to generate a probability value for each of the predictions, the probability value indicative of a probability that the corresponding location is a defect location or a non-defect location.

13. The computer-readable medium of claim 1, wherein the instructions configured to cause the computer system to generate the confidence score are configured to cause the computer system to generate the confidence score for a specified location of the locations based on a comparison of process-related data associated with the specified location and process-related data in the initial training dataset or the training data used to train the defect location prediction model.

14. The computer-readable medium of claim 1, wherein the defect location prediction model includes a plurality of first sub-models, and wherein the instructions configured to cause the computer system to generate the confidence score are configured to cause the computer system to:
    obtain, from each of the first sub-models, a probability value associated with the prediction for a specified location of the locations, and
    generate the confidence score for the specified location as a function of the probability values obtained from the first sub-models.

15. An apparatus for identifying locations to inspect on a first substrate using a machine learning model and for training the machine learning model to identify locations to inspect on a second substrate based on inspection results of the locations on the first substrate, the apparatus comprising:
    a memory storing a set of instructions; and
    at least one processor configured to execute the set of instructions to cause the apparatus to at least:
    input process-related data associated with a substrate to a defect location prediction model;
    generate, using the defect location prediction model, a prediction of defect or non-defect for each of a plurality of locations on the substrate, wherein each prediction is associated with a confidence score that is indicative of a confidence in the prediction for the corresponding location;
    add each of the locations for which the confidence score satisfies a confidence threshold to a set of locations to be inspected by an inspection system;
    obtain inspection results data for the set of locations from the inspection system; and
    input the inspection results data and process-related data for the set of locations to the defect location prediction model for training the defect location prediction model.

16. A method comprising:
    inputting process-related data associated with a substrate to a defect location prediction model;
    generating, using the defect location prediction model, a prediction of a defect or non-defect for each of a plurality of locations on the substrate, wherein each prediction is associated with a confidence score that is indicative of a confidence in the prediction for the corresponding location;
    adding each of the locations for which the confidence score satisfies a confidence threshold to a set of locations to be inspected by an inspection system;
    obtaining inspection results data for the set of locations from the inspection system; and
    inputting the inspection results data and process-related data for the set of locations to the defect location prediction model for training the defect location prediction model.

17. The method of claim 16, further comprising incrementally training the defect location prediction model, wherein the incremental training is an iterative process in which each iteration includes training the defect location prediction model using inspection results data and process-related data of a different substrate that has not been inspected in any prior iteration.

18. The method of claim 16, wherein the adding each of the locations includes adding each of the locations to the set of locations when the confidence score of the prediction of a defect for the corresponding location exceeds a first confidence threshold of the confidence thresholds.

19. The method of claim 16, wherein the adding each of the locations includes adding each of the locations to the set of locations when the confidence score of the prediction of a defect or non-defect for the corresponding location is below a second confidence threshold of the confidence thresholds.

20. The method of claim 16, further comprising determining a prediction accuracy of the defect location prediction model based on a number of correct predictions and a total number of predictions.

* * * * *